United States Patent
Arai et al.

(10) Patent No.: US 7,540,986 B2
(45) Date of Patent: Jun. 2, 2009

(54) SOLUTION CASTING METHOD AND POLYMER FILM

(75) Inventors: Toshinao Arai, Kanagawa (JP);
Hidekazu Yamazaki, Kanagawa (JP);
Sadanobu Fujimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 559 days.

(21) Appl. No.: 11/091,749

(22) Filed: Mar. 29, 2005

(65) Prior Publication Data
US 2005/0242465 A1 Nov. 3, 2005

(30) Foreign Application Priority Data
Mar. 29, 2004 (JP) .............................. 2004-097055

(51) Int. Cl.
*B29C 39/42* (2006.01)
(52) U.S. Cl. ...................... 264/212; 264/216; 264/571
(58) Field of Classification Search .............. 264/212, 264/216
See application file for complete search history.

(56) References Cited

U.S. PATENT DOCUMENTS

| | | | |
|---|---|---|---|
| 4,138,459 A | * | 2/1979 | Brazinsky et al. ............ 264/154 |
| 4,231,164 A | * | 11/1980 | Barbee ......................... 34/452 |
| 4,426,757 A | * | 1/1984 | Hourticolon et al. ........ 226/193 |
| 2001/0009312 A1 | * | 7/2001 | Takeda ......................... 264/216 |
| 2005/0012239 A1 | * | 1/2005 | Nakashima ................... 264/216 |

FOREIGN PATENT DOCUMENTS

| | | |
|---|---|---|
| JP | 11-90942 A | 4/1999 |
| JP | 2001-19833 A | 1/2001 |
| JP | 2001-277267 A | 10/2001 |
| JP | 2001277267 A * | 10/2001 |
| JP | 2001-315147 A | 11/2001 |
| JP | 2001315147 A * | 11/2001 |
| JP | 2002-086474 A | 3/2002 |
| JP | 2002-292658 1 A | 10/2002 |

* cited by examiner

*Primary Examiner*—Monica A Huson
(74) *Attorney, Agent, or Firm*—Sughrue Mion, PLLC

(57) ABSTRACT

Side edge portions of a film in which a content of a remaining solvent is at least 30 wt. % are contacted to side parts of first-third rollers with suctioning through suction ducts. Thus a middle portion between the side edge portions is not contacted to the rollers, and the film is transported toward a tenter device in accordance with the rotation of the rollers. In the rollers, each side part of the rollers has a larger diameter of a middle part. At least one of intervals between the neighboring rollers is from 1 mm to 200 mm, and the lapping angle is from 1° to 180°. Toward the middle part of the film, and air is fed in a roller side. The obtained film doesn't have any neither crumples, wrinkle, curl and the like, and foreign materials are hardly adhered. Therefore the continuous film production can be made stably.

10 Claims, 5 Drawing Sheets

SOLUTION CASTING METHOD AND POLYMER FILM

BACKGROUND OF THE INVENTION

1. Field of the Invention

The present invention relates to a solution casting method and a polymer film produced by the solution casting method, and especially to a polymer film used for a polarizing filter and a liquid crystal display and a solution casting method as a producing method of the polymer film.

2. Description Related to the Prior Art

There are several sorts of polymer films for the optical use. In order to produce such a polymer film, a casting die is usually used to cast a dope onto a support, the cast dope is peeled as the polymer film from the support, and then wound as the polymer film after a drying process. This method is called a solution casting method and a representative method for producing the polymer film.

Because of the large requirement for increasing demands and decreasing the costs for the polymer film for the optical use, it is designated to increase the productivity of the polymer film, namely to increase the film production speed in the solution casting method. Further, in the optical use, the requirements for the higher function and the multi-function are large. Accordingly, it is necessary to make the thickness of the polymer film thinner.

In the above solution casting method, after the dope is peeled as the polymer film from the support, a tenter device for stretching the polymer film and regulating the width thereof is usually provided in a drying process, so as to improve the planarity, a mechanical strength, optical properties and the like.

After peeling from the polymer film from the support, there is an area in which the polymer film is transported toward the tenter device, and the area is called a transporting section, in which driven or non-driven rollers are provided to transport or support the film. In the transporting section, wrinkles, crumples, adhesion of surfaces that is caused with the wrinkles and crumples, curls in side edge portions and the like occur. These are problems on transporting the film in the transporting section. However, while a contact surface to the rollers has slight deformation, the quality of the film becomes lower and the precipitation of the plasticizer on the film surface and the like contaminate the surface of the rollers.

There are several methods for reducing the generation of the film defect in the transporting section. For example, a first roller to which the polymer film peeled from the support contact at first is disposed such that a peeled surface of the polymer film may contact thereto, and a second roller next to the first roller is disposed such that another surface (hereinafter exposed surface) of the polymer film may contact thereto. Further, after the contact to the second roller, the polymer film is dried (see, Japanese Patent Laid-Open Publication No. 2001-198933). Otherwise, at least in the side of the exposed surface, no rollers of the contacting type are used, but a non-contact type transporting device as an air floater, and otherwise, both side edges are held by a holding device such that nothing may contact to a production portion (see, Japanese Patent Laid-Open Publication No. 2001-277267).

Further, after the peeling, the curls formed in the side edges are slit off (see, Japanese Patent Laid-Open Publication No. H11-90942). In the transporting section, the rollers are arranged in zigzag and the rollers are heated to a predetermined temperature for a predetermined period (see, Japanese Patent Laid-Open Publication No. 2001-315147). Further, if it is designated to produce a film whose thickness is 20 µm to 80 µm, the rollers for transporting the film containing a predetermined amount of the remaining solvent satisfy conditions that the surface roughness Ry is at most 0.6 µm and the surface energy is from 70 mN/m to 100 mN/m (see, Japanese Patent Laid-Open Publication No. 2002-86474). Further, in the transporting section, a Vickers hardness of the rollers is in the range of 500 to 800 (see, Japanese Patent Laid-Open Publication No. 2002-292658).

However, in the above methods, it is hard to reduce the generation of the wrinkles and the crumples, the curl of the side edges and the pollution of the roller enough. Especially, when the thickness of the film to be produced is small, the effects are not large. For example, in the publication No. 2001-198933, the first roller to which the polymer film contacts at first after the peeling from the support contacts to the peeled surface. In this case, the content of the remaining solvent in the peeled surface is large and the peeled surface is soft. Therefore the contact to the first roller forms scratches on the peeled surface. Further, in the publication 2001-277267, the non-contact type transporting devices (such as an air floater type and the type for holding both side edges) are used. In this case, for example, when the thickness of the film to be produced is several dozen micrometers and the like or the content of the volatile solvent compounds is high, the film flatters too much and deforms to be corrugated. Thus the surface defect occur and the film is tore by the holding device.

Further, in the method for slitting off the side edges in which the curl is formed, as in the publication No. H11-90942, the curl is removed. However, the wrinkles and the folds are not reduced. In the publications No. 2002-86474 & 2002-292658, although the pollution of the rollers is reduced, the curls in the side edges are not reduced.

SUMMARY OF THE INVENTION

An object of the present invention is to provide a solution casting method in which a film production speed is increased.

Another object of the present invention is to provide a solution casting method in which a film surface doesn't have any slight deformation caused by a wrinkle and a crumples generated on a film in an transporting section, an adhesive agent, and a contact to rollers in the transporting section.

Still another object of the present invention is to provide a solution casting method in which the pollution of the roller is prevented.

Still another object of the present invention it to provide a polymer film excellent in optical property.

In order to achieve the object and the other object, in a solution casting method of the present invention, both side edge portions of a continuous polymer film is drawn with use of at least one suction device to plural rollers arranged in a transporting direction of the polymer film whose content of a remaining solvent is at least 30 wt. %. The suctioning is made such that the side edge portions contact to the rollers and a middle portion between the side edge portions may be apart from the rollers. The polymer film is transported toward a tenter device by rotating the rollers.

Preferably, an interval L1 between the neighboring rollers in the transporting direction is in the range of 1 mm to 200 mm. Further, a lapping angle of each of the side edge portions of the polymer film around the roller is in the range of 1° to 180°.

The suction device includes a suction chamber. A minimum of an interval L2 between the suction chamber and the rollers is in the range of 0.5 mm to 5 mm. A minimum of an interval L3 between the suction chamber and the polymer film is in the range of 5 mm to 30 mm.

In a preferable embodiment of the present invention, when a rotational speed of downstream one of the neighboring rollers in the transporting direction is VD and a rotational speed of an upstream another one is VU, a ratio VU/VD of the rotational speed is in the range of 1.00 to 1.15. Further, an air is supplied toward the middle portion in a roller side.

In the present invention, a polymer film is produced by the above solution casting method.

In the prior art, crumples and wrinkles are formed on the polymer film in the transporting section, and the film surface is slightly deformed by an adhesion of the films, an contact of the rollers in the transporting section to the film, and the like. Further, the additives are deposited from the polymer film to pollute the rollers.

According to a solution casting method of the present invention, the crumples, the wrinkles, the pollution and the like are prevented. As a result, is designated to make the thinner film with increase of the film production speed. Further, the polymer film produced in the present invention has excellent in the optical properties, and therefore can be used suitably in a polarizing filter, as a protective film for the polarizing filter, in a liquid crystal display.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
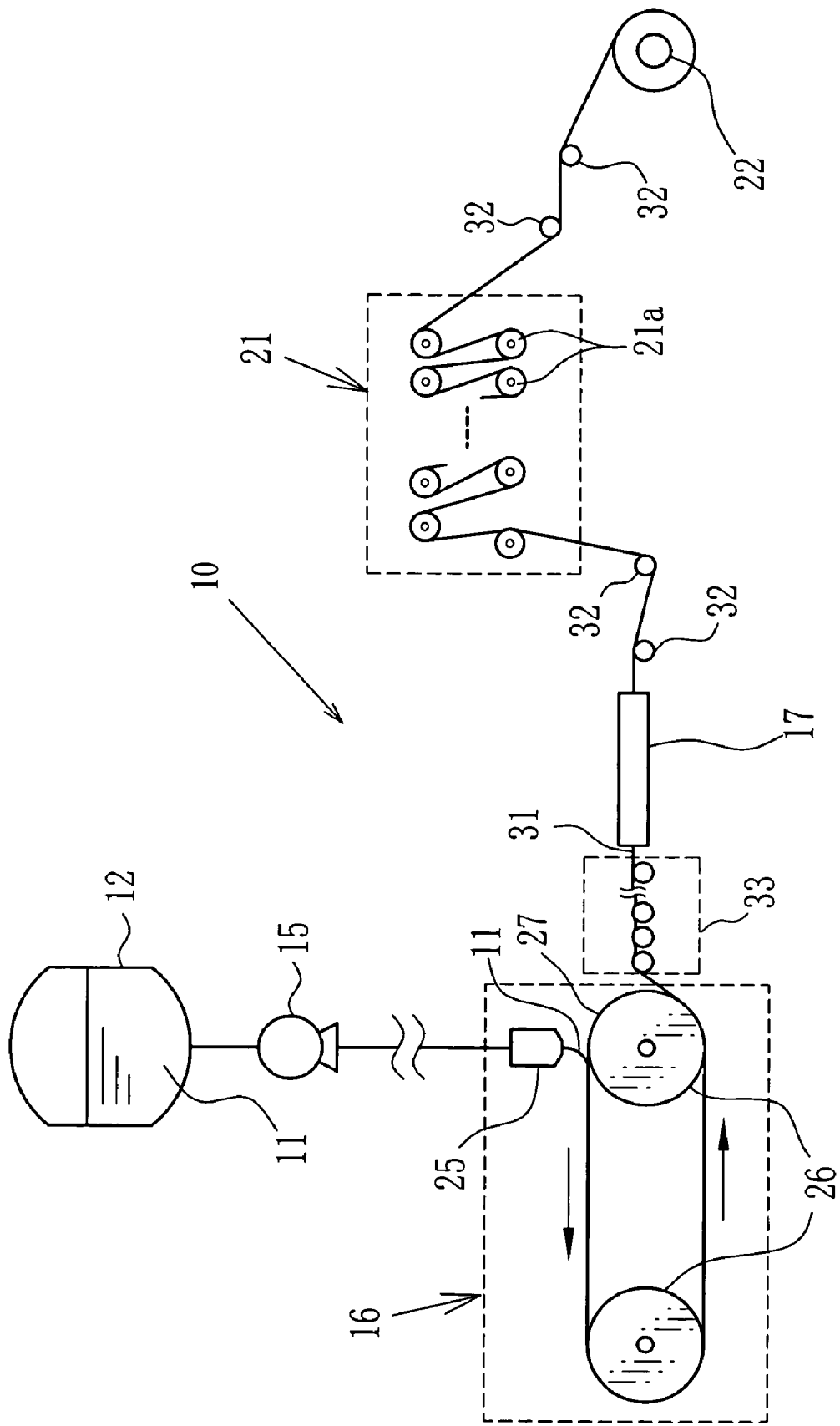
FIG. 1 is a schematic diagram of a production equipment of a polymer film in a solution casting method according to the present invention.

In FIG. 1, a solution casting equipment 10 includes a reserve tank 12 in which a dope 11 is supplied, a feed pump 15, a casting apparatus 16, a tenter device 17, a drying apparatus 21 and a winding apparatus 22. The casting apparatus 16 has a casting die 25 and a belt 27 as a support moved by back-up rollers 26. Further, between the casting apparatus 16 and the tenter device 17, there are many rollers 32 for supporting or transporting a film 31. The number of the roller 32 is not restricted in FIG. 2, and may be changed adequately. Further, the type of the rollers is adequately chosen between the driven type or the non-driven type. Note that only parts of the rollers are illustrated in FIG. 1. Further, a space between the casting apparatus 16 and the tenter device 17 is called an transporting section 33 which is explained later in detail.

The dope 11 fed from the reserve tank 12 to the casting die 25 by the feed pump 15 is cast onto the belt 27, which is continuously transported by the back-up roller 26. Thus the casting of the dope 11 is continuously made. When the cast dope has a self-supporting property, the dope 11 is peeled as the film 31. In the peeling, the film 31 is lapped around a roller disposed in the most upstream side in the transporting section 33, and the peeling is continuously made by rotating this roller. A surface of the film 31 that is peeled from the belt 27 is called a peeled surface, and another surface is called a non-peeled surface. The peeled film 31 is transported through the transporting section 33 to the tenter device 17.

In the tenter device 17, the width of the film 31 is regulated and the film 31 is stretched and simultaneously dried. In the tenter device 17, tenter clips (not shown) moves on rails with holding both side edges, and thus the film is transported. Sometimes, instead of the tenter clips, pin clips and the like may be used. The tenter clips are opened and closed by a controller (not shown) automatically, and the holding and the releasing of the film is made by opening and closing. The tenter clips holding the film 31 move in the tenter device 17, and when they get to a predetermined releasing position near an exit, the clips are automatically controlled to open, and thus the film 31 is released.

The film 31 is transported from the tenter device 17 to the drying apparatus 21 as a next process by the rollers 32 for support or transport. After the drying of the film 31 is enough made with support and transport with plural rollers 21a, a slitter (not shown) slits off the side edges of the film 31, and then the remaining part of the film is wound as the film product.

Figure 2:
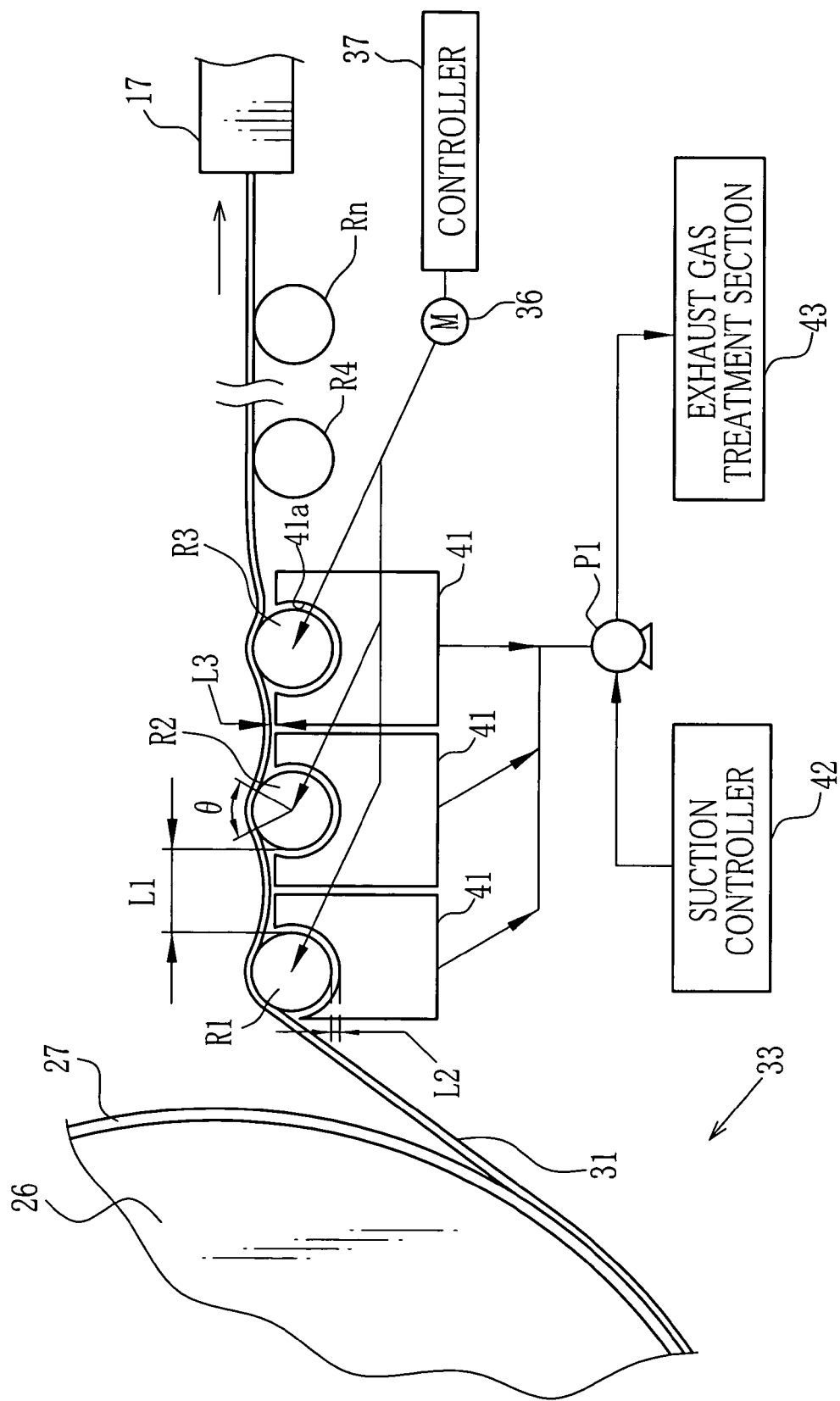
FIG. 2 is a schematic diagram of one embodiment of a transporting section of the film production equipments to which a solution casting method is applied.
Figure 3:
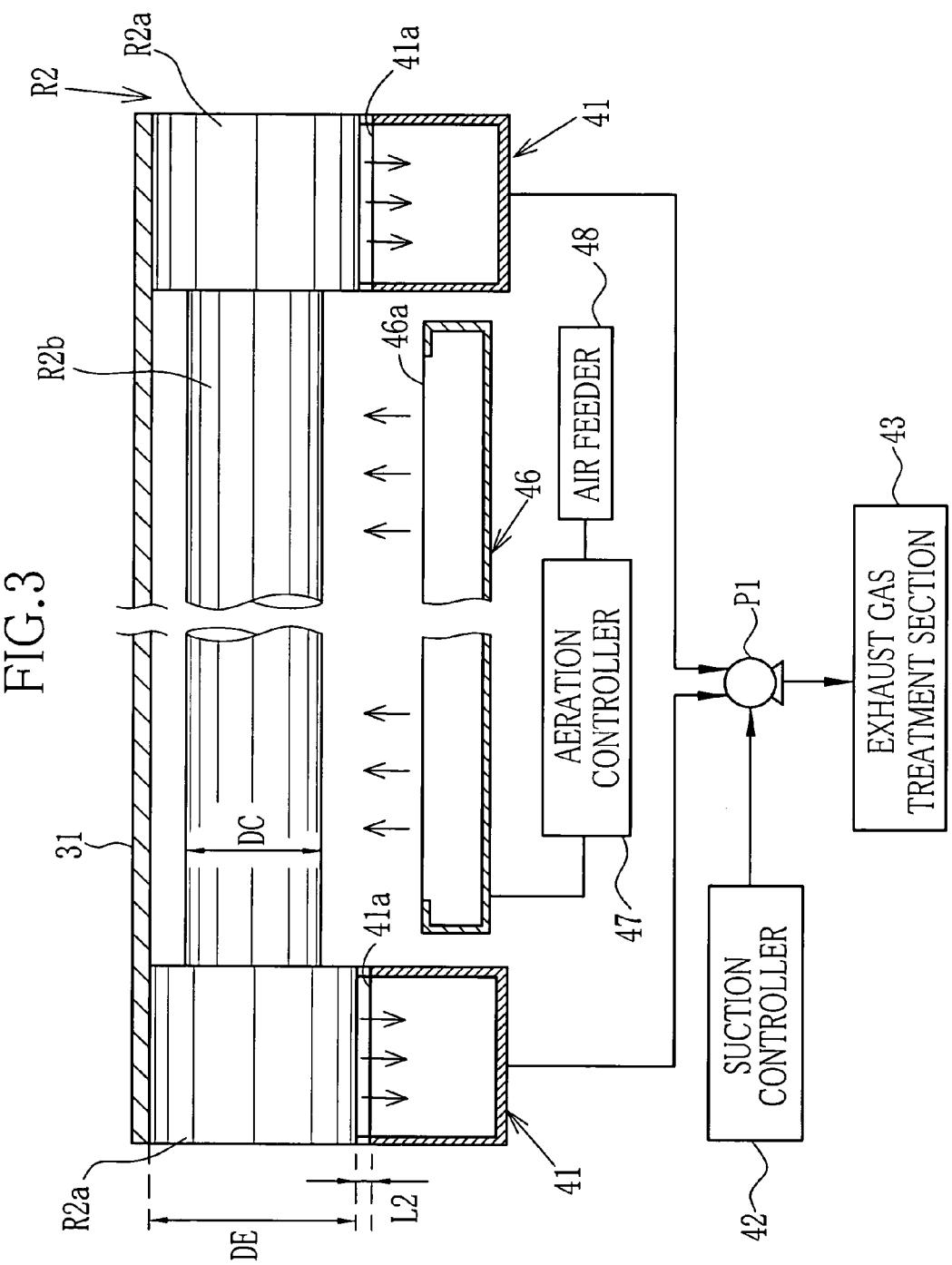
FIG. 3 is an explanatory view illustrating a situation of transporting a film with use of an embodiment of a roller in a transporting section.

Further, in reference to FIGS. 2&3, an embodiment of the present invention is explained in detail. As shown in FIG. 2, plural rollers are disposed in the transporting section 33, and named first to $n^{th}$ rollers whose numerals are R1 to Rn (n; natural number). FIG. 3 illustrates a situation of the film transport on the second roller R2. However, since the situation of the film transport on the first and third rollers R1,R3 are the same as on the second roller R2, the illustration and the explanation are omitted. The first to third rollers R3 are provided with a motor 36 and a controller 37. The drive of the motor 36 is controlled by the controller 37, and thus the rotation rate and the torque of the first-third rollers R1-R3 are regulated.

The second roller R2 is almost symmetrical to a central line in a lengthwise direction, and a diameters DE of each side part R2a is the same, and larger than a diameter DC of a middle part R2b. The diameter DC of the middle part R2b is constant in the lengthwise direction of the second roller R2. A length of the middle part R2b having diameter DC is smaller than the a width of the film 31 and larger than a width of a production portion of the film 31. Thus the side edges of the film 31 contacts to both of the side parts R2b of the second roller R2 so as to be supported, and the scratches and the like cannot be formed in the production portion.

In this embodiment, the film 31 containing the remaining solvent at the high content, at least 30 wt. % contacts to the first to third rollers R1-R3 with support, or transported. Thus all portions of the film 31 don't contact to a surface of the roller, but both side edge portions contact to the first-third rollers R1-R3 and the middle portion doesn't contact to any of them. Therefore the friction of the film 31 to the surfaces of the rollers becomes smaller, and the crumples and wrinkles aren't formed. Further, in this embodiment in which the first-third rollers have the above structure, a contact area of the film 31 to the rollers becomes smaller than in the case in which cylindrical rollers having constant diameter in the widthwise direction of the film 31 are used. Therefore, it becomes hard that the film 31 adheres to the surface of the rollers, and the defect of the film that is caused by the adhesion hardly occurs. Further, it is prevented that the plasticisers and the like deposits from the inner side to surfaces of the film 31. Therefore the pollution of the surfaces of the rollers doesn't occur in development of the time.

It is not necessary that the diameter DC of the middle part R2b is constant in the lengthwise direction of the second roller R2b. For example, as a concave roller already known, the diameter of the roller may gradually become smaller toward a center the roller.

In the film 31, since only the side edge portions are supported by the second roller R2, frictions for supporting the film 31 are intensively applied to the side edge portions as contact portions. Therefore, a force to the transporting direction is applied to the side edge portions of the film 31 more than when the cylindrical rollers with constant diameter are used. Thus the generation of the curling in the side edge portions of the film 31 and the slight deformations of the contact surface of the film to the surface of the roller are prevented.

As shown in FIGS. 2&3, suction ducts 41 made of SUS are disposed below both side parts of the first-third rollers R1-R3 and in a side of the film surfaces supported by the first-third rollers R1-R3, namely, an opposite surface to the peeled surface of the film 31 in this embodiment. The suction ducts 41, as shown in FIG. 3, has a box-shape, in which a face in the film side is open. Further, as shown in FIG. 3, a length of the suction duct 41 in the widthwise direction of the film is almost the same as the width of the side part R2a of the second roller R2. Preferably, the suction duct 41 is not positioned only below the rollers R1-R3, but extends in a lower area from the film between the rollers R1-R3.

The suction duct 41, a suction controller 42, an exhausting gas treatment section (hereinafter, treatment section) 43, and a pump P1 construct a suction device, which suctions an air in a side of the peeled surface of the film 31 so as to draw the film onto the first-third rollers R1-R3. A suction power through the suction duct 41 by the pump 41 is controlled by the suction controller 42, and the treatment section 43 concentrates and recovers a solvent vapor mixed in the suctioned air.

Then, as shown in FIG. 3, between both suction ducts 41 below the side edge portions of the film 31, there is an aeration duct 46 for supplying the air toward the middle portion in the widthwise direction of the film 31. The aeration duct 46 includes an aeration controller 47 and an air feeder 48. The aeration controller controls airflow from the air feeder 48, so as to regulate an aeration speed from the aeration duct 46.

In the transporting section 33, the film 31 peeled from the belt 27 is transported toward the tenter device 17 with support by the first-third rollers R1-R3. As described above, in the present invention, both edge portions of the film 31 are drawn to contact to both side parts R2a of the second roller R2, and the film 31 is transported in accordance with rotation of the second roller R2. Further, while the content of the remaining solvent is in the range of 30% to 300%, the film 31 is supported by the first-third rollers R1-R3. In this case, each roller intervals L1 as an interval between the first and second rollers R1,R2 and that between the second and third rollers R2,R3 is in the range of 1 mm to 200 mm. In this embodiment, in the film transporting section in which the content of the film is 30 wt % or more, each roller interval is preferably in the above range. However, at least one of the roller intervals (one of the two roller intervals in this embodiment) may be in the above range.

An interval (hereinafter roller-duct interval) L2 between the second roller R2 and a side wall of the suction duct 41 is in the range of 0.5 mm to 5 mm. When the roller-duct interval L2 is less than 0.5, the second roller R2 vibrates to hit the suction duct 41, and dusts and the like clog between the roller and the suction duct 41 to decrease the suction efficiency. When the roller-duct interval L2 is more than 5 mm, much air leaks through the roller-duct interval, and therefore the suction power cannot be predetermined value.

Between the first and second rollers R1,R2 and between the second and third rollers R2,R3, the position of the film 31 is controlled to have intervals (hereinafter film-duct interval) L3 to the suction duct 41 during the suction. The film-duct interval L3 is preferably in the range of 5 mm to 30 mm. If it is less than 5 mm, the slight variation of the suction power causes the film 31 to hit the suction duct 41, and the continuous drive of the equipment becomes harder. Further, if the film-duct interval L3 is more than 30 mm, much air leaks through the film-duct interval. Therefore the suction power cannot be predetermined value and lapping angles substantially don't satisfy conditions which will be described below.

Thus since the film 31 is stably supported by contacting both side edge portions to the first-third rollers R1-R3, the transport in the transporting section becomes stable. Further, while the suction duct 41 suctions the solvent vapor, the concentration of the solvent vapor around the film 31 is controlled to be at most the predetermined value, and the film 31 is dried in the transporting section at a predetermined drying speed. Further, since the treatment section 43 for the treatment of the exhausted gas is provided, the suctioned solvent vapor is concentrated, recovered and therefore used as raw materials of the dope. Therefore, this embodiment is efficient in view of the cost, and prevents the pollution of environment. Note that the above content of the remaining solvent is a criterion, which can be calculated as a value (unit %) from a formula of a weight X1 of the film at the sampling and a weight X2 of the film after the enough drying with use of the homothermal drying apparatus: $\{(X1-X2)/X2\}\times 100$ In the transporting section in which the content of the solvent is in the above content range, it is especially preferable that the roller interval L1 is in the above interval range. However, the present invention is not restricted in it, and when at least one of the roller intervals L1 may be in the above interval range, the present invention is efficient. If the roller interval L1 is less than 1 mm, foreign materials are sandwiched between the rollers, and the film is pressed strongly by the foreign materials. Thus the scratches, the splits and the like are sometimes formed in the film, and the rollers vibrate to hit each other such that the stable transporting becomes harder. If the roller interval L1 is more than 200 mm, the suction power applied to the film 31 between the rollers hardly controlled, and the suction duct 41 sometimes hit the film 31.

In the above method, not only the crumples and the wrinkles of the film, the film adhesion, the curl of the side edge portions but also the surface defect occurring on the rollers, the pollution of the rollers and the like are prevented. If the content of the remaining solvent in the film is more than 30%, especially if the surface resistance of the film is more than $10^8$, the film hardly becomes charged. Further, in this case, when the hazardous materials are used as the solvent, the present invention is effective in view of prevention of charging. The reason therefor is that the film is transported without the contact of almost of areas of the film to the rollers in the above method.

The suction pressure of the suction duct 41 is preferably adjusted such that the pressure in a lower side from the film may be in the range of −1000 Pa to −10 Pa, and especially in the range of −500 Pa to −20 Pa.

The driven roller in this embodiment is the first-third rollers R1-R3. However, other rollers may be driven rollers, independent from whether the suction ducts 41 are provided below the side edge parts. Further, it is not necessary that all of the first-third rollers R1-R3 are the driven rollers. The neighboring two rollers in the above transporting section may be the driven roller. These two rollers have the same structure as the second roller R2, and the suction duct 41 is disposed below both side edges portion of the film.

In the present invention, a lapping angle θ at which the film 31 is lapped on the first-third rollers R1-R3 for contacting with suction is preferably in the range of 1° to 180°. In this embodiment, the lapping angle θ is in the range of 1° to 30°, and preferably in the range of 1° to 10°. The lapping angle θ is determined as an angle at which the film laps on the film 31 while the film 31 is drawn to the second roller by the suction duct 41. For example, the lapping angle θ of the second roller R2 is controlled by regulating the relative positions of the first-third rollers R1-R3 and the suction power of the suction duct 41.

Especially preferably, the lapping angles θ of each roller is in the above range. However, the present invention is not restricted in it, and even effective when at least one of the lapping angle θ is in the above range. If the lapping angle θ is less than 1°, the effect of the film transporting is substantially not enough, and if the lapping angle θ is more than 180°, the contact of the film to the roller increases the friction force too much, and the surface defect occurs depending sorts of the film and the transporting speed.

In the present invention, when the respective rotational speeds of the first-third rollers are V1-V3, one of values of V2/V1 and V3/V2 is preferably in the range of 1.00 to 1.15, and in this embodiment, the control is made such that all the values may be in the above range. Namely, in an area in which the content of the remaining solvent in the film is 30 wt. % or more, an upstream one of the neighboring driven rollers arranged in the transporting direction has a rotational speed VU, and a downstream one has a rotational speed UD. In this case, a ratio VD/VU preferably satisfy $1.00 \leq VD/VU \leq 1.15$.

If the ratio VD/VU is less than 1.00, the film sometimes flatters depending combination of the suction power, the roller interval L1 and an own weight. Further, if the ratio VD/VU is more than 1.15, a tension to be applied to the film 31 with large content of the remaining solvent is larger than the predetermined value in the transporting direction. Thus the film is stretched to be nonuniform, and sometimes torn.

Further, in the present invention, in order to increase the efficiency, the suction duct 41 is disposed at the above position for feeding the air toward a middle area of the film 31. The feed of the air proceeds the drying of the production portion of the film 31, and makes the transport of the film more stable. The reason therefor is that the feed of the air generates a stable stream of the air from an outlet 46a of the aeration duct 46 to an inlet 41a of the suction duct 41 in a side of the second roller R2 from the film, and thus the suction power of the air into the suction duct 41 becomes uniform. Preferably, as in FIG. 3 of this embodiment, the aeration duct 46 is provided below the second roller R2 between the paired suction ducts disposed near both side edge portions of the film 31. However, it is not necessary to provide the aeration duct in each space between the paired suction ducts 41. The aeration duct 41 may be in at least one space between the paired suction ducts 41.

The wind speed S1 of the air discharged from the aeration duct 46 is preferably in the range of $0.3 \leq (m/s) \leq S1 \leq 20$ (m/s). In S1<0.3 (m/s), the above efficiency of the air feed is not enough, and in S1>20 (m/s), the wind pressure to the film 31 is too strong and therefore the film is sometimes torn. However, the preferable range of the wind speed depends on the suction power of the paired suction ducts 41, the content of the remaining solvent in the film 31 and an own weight of the film 31, and therefore is not restricted in the above range. Further, the air discharged from the aeration duct 46 is suctioned from outside with use of the air feeder 48. However, the present invention doesn't depend on the functions and forms of the aeration controller 47 and the air feeder 48. for example, instead of them, a pump and an adjusting valve for adjusting air volume may be used for feeding the outer air toward the suction duct 46. Thus the air feed volume is controlled.

In this embodiment, the aeration duct 46 has quadrate pores whose size is from 2 mm$^2$ to 4 mm$^2$, such that the pore ratio may be 5%. However, the present invention is not restricted in the outlet 46a of the porous type. For example, instead of the porous type, there may be many rectangular slits extending in the widthwise direction of the film 31 for feeding the air through the slits. Further, in case of the porous type, the present invention doesn't depend on the shape and arrangement of the pores. For example, the pores may be circle, and arranged in zigzag. Note that the pore ratio is preferably in the range of 1% to 35%, and especially 5% to 20%, in view of the drying efficiency and the prevention of contacting of the film to the roller. The pore ratio can be obtained from a formula {(pore area)/(periphery area of third roller R3)}×100.

A treatment for providing surface roughness is made to the side parts R2a of the second roller R2 such that the film 31 may be hold with high efficiency. A length of a surface roughness treatment portion in the lengthwise direction of the second roller is preferably in the range of 2 mm to 20 mm. When the length is more than 20 mm, the efficiency of holding the film hardly increases, and when the length is less than 2 mm, the efficiency of holding the film doesn't increase. In the treatment of the surface roughness, the side parts R2a may be provided with grooves and a corrugated shape and the like.

In the side of the peeled surface of the film 31 from the belt 27, a nip roller (not shown) may be provided for nipping the film 31 in combination with the second roller R2, and otherwise in combination with the first or third roller R1,R3. Thus the film 31 is stably supported with nipping the side edge portions of the film 31. If the nip rollers are used, the linear pressure is preferably in the range of 20 Pa to 400 Pa, and especially in the range of 50 Pa to 100 Pa.

In the side of the peeled surface, at least another aeration duct for feeding the air toward the side edge portions of the film 31 may be provided. If the feed of the air is made through this aeration duct, the contact of the film to the roller becomes more stable, and the continuous transport of the film is made efficiently. The wind pressure from the aeration duct is preferably in the range of 6 m/s to 25 m/s, and especially in the range of 9 m/s to 13 m/s. In the present invention, one or both of the aeration duct and the nip roller may be used.

As shown in FIG. 3, the film 31 is transported without contacting to the middle part R2b of the second roller R2. However, for example, if the transporting speed is more or less than the predetermined values, the film sometimes contact to the middle part R2b. Accordingly, the coating processing with use of the fluorine type polymer, polytetrafluoroethylene and the like, is made on the surface of the middle part R2b of the second roller 2R. The coating of the fluorine type polymer decreases the friction of the film 31 to the middle part R2b of the second roller R2 at the contact. Thus the damage of the film 31 is prevented. The material for the coating is especially preferably the fluorine type polymer. However, the material is not restricted in it, but may be a material for decreasing the friction to the film by the predetermined value. Further, the processing for decreasing the friction is not restricted in the coating, and metal materials having enough surface smoothness may be used on the surface of the middle part R2b for preventing the film damage.

Further, when the content of the remaining solvent in the film 31 is less than 30 wt. %, the present invention is hardly effective in the transporting with suction of the side edge portions. Therefore, for example, the $n^{th}$ roller Rn contacting to the film in which the content of the remaining solvent is less than 30 wt. % may be cylindrical and have a uniform outer diameter in the lengthwise direction. Further, the suction duct 41 may be omitted.

Figure 4:
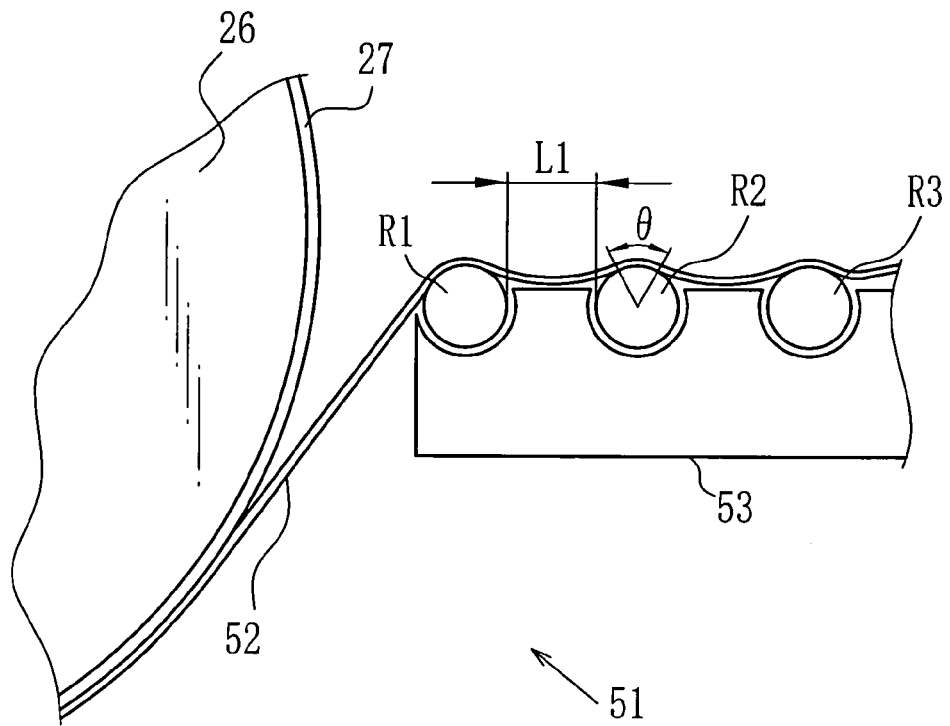
FIG. 4 is an explanatory view illustrating a situation of the other transporting section.

Another embodiment will be explained with reference to FIG. 4, in which the same members, devices and the like are provided with the same numerals as in FIGS. 2&3. In an transporting section 51 of this embodiment, a film 52 peeled from the belt 27 is supported by the first-$n^{th}$ rollers R1-Rn. In this embodiment, instead of the suction ducts 41 (see, FIG. 2), a suction duct 53 extending in the transporting direction is used. The situations of the exposure of the rollers R1-Rn to the suction duct 53, the roller-duct distance, the film-duct distance and the like are almost the same as the above embodiment.

Similarly to the above embodiment, both side edge portions of the film 52 are drawn to contact to the first-third rollers R1-R3, and then transported in accordance with the rotation of the rollers R1-R3. Thus this embodiment is also effective similarly to the above embodiment. The suction duct may not have a different shape corresponding to that of the roller, and may have a shape extending in a predetermined area with support of the side edge portions.

Figure 5:
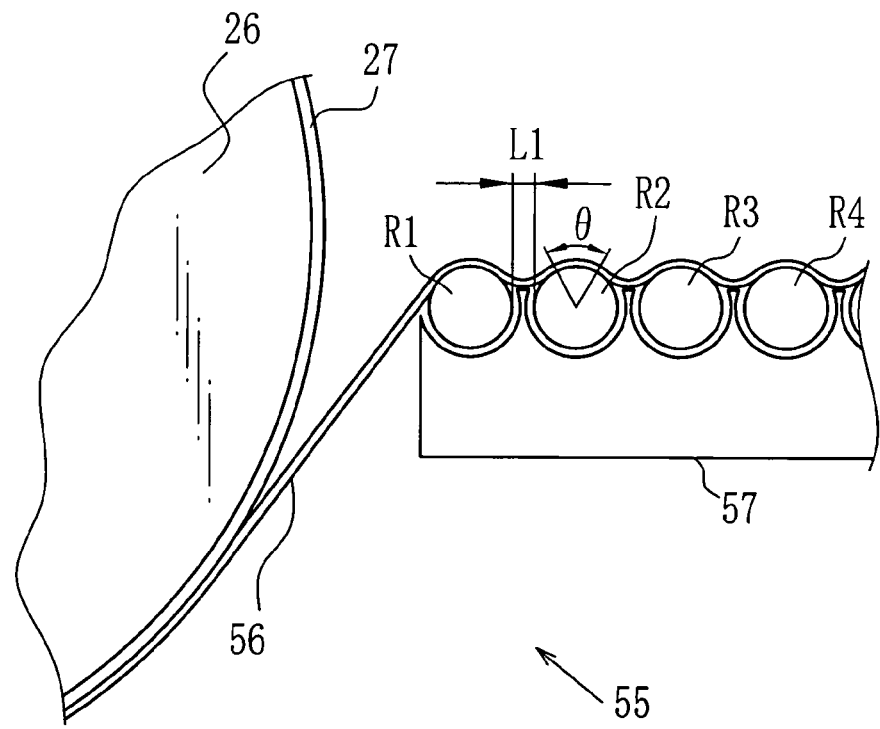
FIG. 5 is an explanatory view illustrating a situation of the other transporting section.

Still another embodiment will be explained in reference to FIG. 5 in which the same members, devices and the like are provided with the same numerals as in FIGS. 2&3. In an transporting section 55, the first-$n^{th}$ rollers R1-Rn are disposed in an area in which the polymer film with at least 30 wt. % as the content of the remaining solvent is transported, and positioned more closely than in the above two embodiments. The roller interval L1 is set to be more smaller than the above embodiments. Further, the suction duct 57 is different from that in the first embodiment in which the plural suction ducts are disposed below the respective rollers, but the same as the second embodiment, in which the suction duct extends in the transporting direction.

Since the first-$n^{th}$ rollers are closely disposed, the control of the suction force is more efficient and the present invention is precisely performed. Therefore, the surface defect of the film is effectively reduced.

Figure 6:
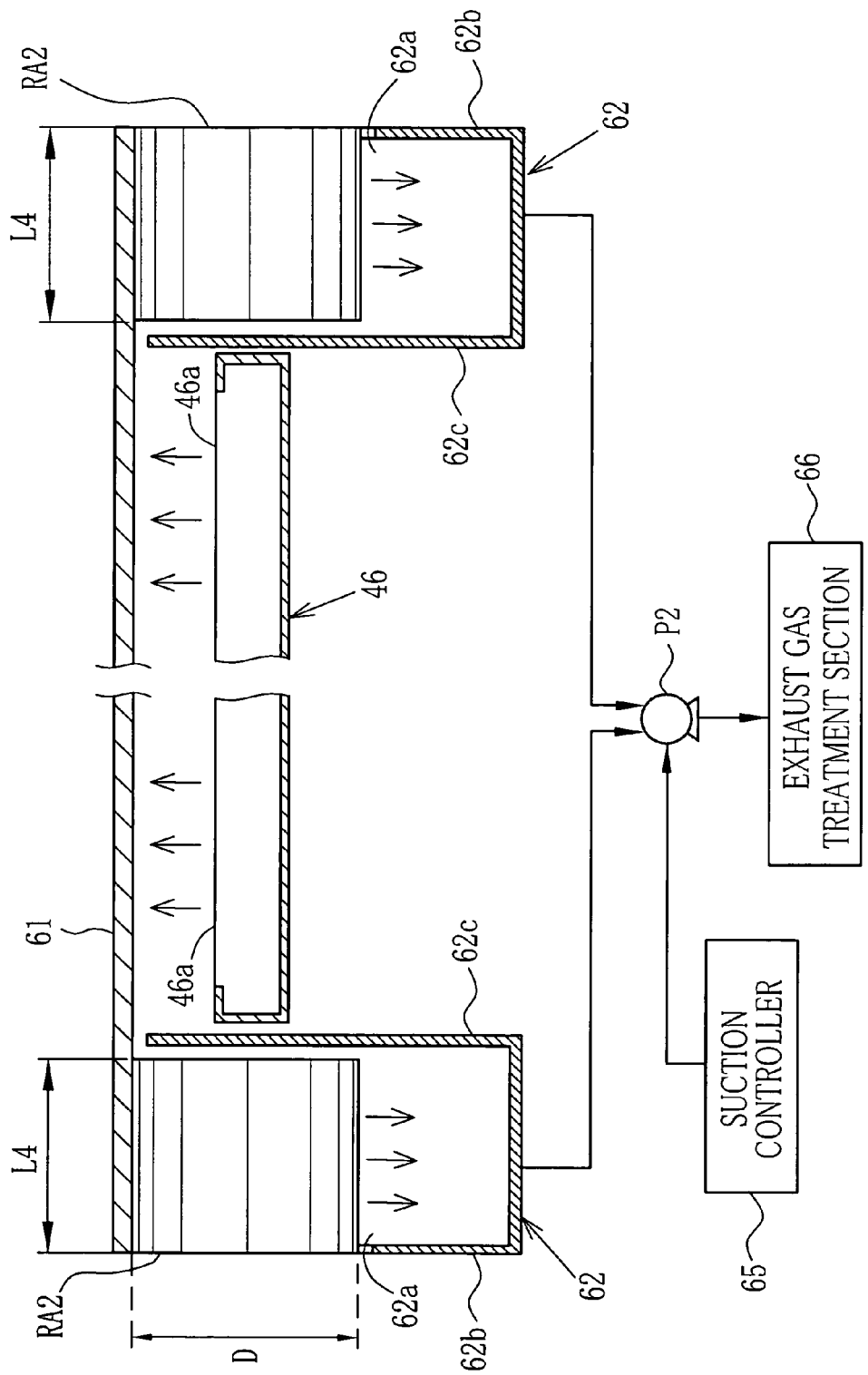
FIG. 6 is an explanatory view illustrating a situation of transporting a film with use of an embodiment of the other roller in a transporting section.

Still another embodiment will be explained in reference to FIG. 6, in which short shaft rollers are used second rollers RA2, instead of the second roller R2 of the first embodiment. The second roller RA2 has a rotation shaft having the length L4 which is almost the same as the side edge portion of the film 61 which is to be supported. In this embodiment, the two second rollers RA2 are confronted to each other below both side edge portions of the film 61. The second rollers RA2 are independently driven in this figure. However it is not necessary to drive them independently. Further, the diameter D of the second roller RA2 is the same as that of the second roller R2 in the first embodiment. In this figure, the same members, devices and the like are provided with the same numerals as in FIGS. 2&3. Further, the aeration duct 46 is connected to the aeration controller and the air feeder that are the same as in the first embodiment. Therefore explanations thereof are omitted.

The suction duct 62 used in this embodiment has an inlet 62a as an opening similarly to the suction duct 41 of the first embodiment. Then outer side plates 62b are disposed such that an outer one of side faces of the second roller RA2 may appear. Inner side plats 62c have height so as to be closed to the film 61 and cover over inner sides of the second rollers RA2.

In this embodiment, the air is suctioned between the outer side face of the second roller RA2 and the outer side plate 62b of the suction duct 62 and between the film and each side plate 62b, 62c, such that the side edge portions are drawn to contact to the second rollers RA2. Then the second roller RA2 is driven to rotate. Therefore the film 61 is transported without the surface defect.

Further, since the air is fed toward a surface of the film 61 in the side of the second roller RA2 similarly to the first embodiment, the film 61 is drawn more effectively to the suction duct 62. Therefore, the film transport is stably made, and the surface defect is more effectively reduced. In this embodiment, since the transporting conditions are the same as in the first embodiment, the explanations thereof are omitted. Further the same rollers as the second roller RA2 may be used as the first-$n^{th}$ rollers in the transporting section, and preferably arranged in the area in which the film with at least 30 wt. % as the content of the remaining solvent is transported. Further, the roller interval L1 (see, FIG. 2) in the transporting direction is in the range of 1 mm to 200 mm.

As described above, in the present invention, the rollers are disposed so as to confront to both side edge portions of the film, and a plurality of the rollers are arranged in the transporting direction. Further the roller interval is in the range of 1 mm to 200 mm. The film drawn to the suction duct contacts to the roller, and is transported in accordance with the rotation of the roller. Thus the crumples, wrinkles and the like are prevented, and the adhesion of production portion to the roller is prevented to make the transporting adequately. Thus the film of high quality without surface defect can be produced.

As the film to be produced in the present invention is preferably cellulose acylate film, and especially cellulose triacetate film. However, the present invention is not restricted in it. Namely, the polymer or precursors thereof as main components of the film 31 may be used, if they are dissolved such that the dope is obtained. If cellulose triacetate is used, the raw material thereof is one or both of cotton linter and wood pulp.

Further, the present invention is not effective to only the film having single layer structure, but the film having multilayer structure to be produced by the sequentially casting method or the co-casting method.

In the present invention, the solvent compounds used for the film production may be already known. For example, one or mixture of alcohols, ethers, esters, ketones and the like can be used.

In the present invention, several sorts of additives may be contained in the film adequately. As the additives, there are plasticisers, UV-absorbing agents, dyes, optically anisotropic compounds, matting agents and the like.

Further, the present invention includes a polymer film produced in the above solution casting method, and the film can be applied to the protective film for a polarizing filter, and to a liquid crystal display.

For example, if it is designated to produce the polarizing filter with used of the film formed from the cellulose triacetate and the like by the solution casting methods of the above embodiments, the films of the cellulose triacetate and the like are adhered to a polarized film produced from the polyvinylalcohol type film. The polarized film is obtained by staining with the polyvinylalcohol type film, and the staining method is usually a gas-phase adsorption method and a liquid-phase adsorption method. In this embodiment, the liquid-phase adsorption method is performed.

In order to make the dying by the liquid phase adsorption, iodine is used in this embodiment. However, the present invention is not restricted in it. The polyvinylalcohol film is dipped in a iodine/potassium iodide (KI) aqueous solution in 30 to 5000 seconds. Preferably, the content of the iodine is from 0.1 g/litter to 20 g/litter in the solution, and that of the potassium iodide is from 1 g/litter to 100 g/litter in the solution. Furthermore, the temperature of the solution during the dipping is in the range of 5° C. to 50° C.

As the liquid phase adsorption method, there are not only dipping method, but also already known methods, such as a method of coating the polyvinylalcohol film with the solution of dyes such as iodine and the like, and a method of spraying the solution onto the polyvinylalcohol film. The dying can be made before or after the stretching of the polyvinylalcohol. However, when the dying of the polyvinylalcohol film is made, the polyvinylalcohol film swells adequately, and thus the stretching can be made easily. Therefore, it is preferable to make the dying before the stretching.

Instead of iodine, dichroic dye (including pigments) is preferably used. In the dichroic dyes, there are dye materials of azo type dyes, stilbene type dyes, pyrazolone type dyes, triphenylmethane type dyes, quinoline type dyes, oxadine type dyes, tiadine type dyes, anthraquinone type dyes and the like. Preferably, the dye materials can be dissolved to water. Preferably, a dichroic dye molecule has hydrophilic group, such as sulfonic acid group, amino group, hydroxyl group and the like.

In the process for producing the polarized film by stretching the polyvinylalcohol type film after coloring, compounds (or cross-linking agent) for cross-linking polyvinylalcohol is used. Concretely, the polyvinylalcohol type film is dipped into a solution of the cross-linking agent before and in the stretching process, and otherwise the cross-linking agents are coated or sprayed onto the polyvinylalcohol type film. Thus, the polyvinylalcohol type film is hardened so as to have adequate orientation. Note that the cross-linking agent of polyvinylalcohol type polymer is preferably boric acid based materials, but is not restricted in them.

The films are adhered to the polarized film with the adhesive agent, and the adhesive agent may be already known. Especially preferable are solutions of boron compounds or polyvinylalcohol which contain denatured polyvinylalcohol having acetoacetyl group, sulfonic acid group, carboxyl group, oxyalkylene group and the like. Preferably, the adhesive agent has thickness from 0.01 μm to 10 μm after drying, and particularly from 0.05 μm to 5 μm. Further, an anti-reflection layer, an antiglare layer, a lubricant layer, an easy adhesive layer and the like are formed on a cellulosetriacetate film as a protective film provided with a polyvinyl alcohol layer.

Further, an optical compensation sheet is applied to the polymer film (especially cellulose triacetate film) obtained in the present invention, so as to use as an optical compensation film. When the antireflection layer is formed on the polarizing filter, the antireflection film is obtained and used as one of two surfaces of the protective films. Thus the liquid crystal display of following types can be obtained: transmissive type, reflective type, or transflective type, such as twisted nematic (TN), super twisted nematic (STN), vertical alignment (VA), in plain switching (IPS), optically compensated bend cell (OCB) and the like. Further, the optical compensation film (such as wide view film for widening the view angle of the liquid crystal display) and the birefringence filter may be combined with the film of the present invention. When the film of the present invention is used in the liquid crystal display of the transmissive type or the transflective type, the brightness enhancement film (film of polarization splitter having a layer of polarization selecting, for example D-BEF produced by Sumitomo 3M Ltd.) in the market is simultaneously used. Thus the produced liquid crystal display has high visibility.

EXPERIMENT 1

EXAMPLE 1

With use of the solution casting equipment as shown in FIG. 1, the cellulose triacetate film was produced. At the peeling from the belt 27, the surface temperature of the belt was 25° C. In the transporting section 33, as shown in FIG. 2, the four rollers R1-R4 were positioned so as to contact to the exposed surface as the another surface from the peeled surface of the film. The roller intervals L1 between the first and second rollers R1,R2 and between the second and the third rollers R2,R3 were 10 mm. Further, in each first-third rollers R1-R3, the outer diameter of the side part for supporting the film was 90 mm, the outer diameter of the middle part was 60 mm, the length of the side part in the lengthwise direction of the roller was 280 mm, the length of the middle part was 1600 mm. Further, the fourth roller R4 was cylindrical and the total length thereof was 1880 mm. In the side parts of each First-third roller R1-R3, many retractions were formed, and the depth of the retraction was 2 mm. The retractions formed a corrugated pattern on the surface, and the intervals of the retractions were 3 mm. Further, the lapping angle around each first-third roller R1-R3 was 2°, the duct-roller interval L2 was 1 mm, and the duct-film interval L3 was 15 mm.

Further, near each side part of the first-third rollers R1-R3, the suction duct 41 is provided for suctioning the air around the side portion of the film 31 in the side of the exposed surface. Thus the pressure near the side portion becomes 100 Pa lower than the atmospheric pressure. Between the paired suction ducts 41 arranged in the widthwise direction of the film 31, the aeration duct 46 was provided for feeding the air at 30 m2/minute. Further, the ratios V2/V1, V3/V2 of the rotational speed of the rollers were 1.00.

The temperature of each side parts of the first-third rollers R1-R2 and the periphery of the fourth roller R4 were 5° C. The wind speed and the temperature of the blown air from the aeration duct 46 were 3 m/second and 10° C., respectively. In the film 31 on the first roller R1, the content of the remaining solvent was 150 wt. %.

After the transporting section 33, the film 31 was stretched with regulation of the width and dried. Then the drying of the film 31 was further performed in the drying apparatus 21, and then the side edge portions of the film 31 were slit off. Thereafter, the film 31 was wound. The thickness of the obtained film was 40 μm, and the transporting speed of the film 31 was 70 m/minute.

As a result of the Experiment 1, the transporting was made stably, and the surface condition of the obtained film was good.

(Comparison 1-1)

The suction duct 41 was not provided, and the contact of the film 31 to the first-third rollers R1-R3 with suction was not made. Other conditions were the same as in Example 1.

(Comparison 1-2)

The first-fourth rollers R1-R4 were cylindrical rollers, and the lengths of the rollers R1-R4 in the lengthwise direction were 1180 mm. Other conditions were the same as in Example 1.

As the results of the comparisons 1-1&1-2, the crumples and the wrinkles were formed on the film 31 on the first-fourth rollers R1-R4, and some materials of the film 31 remains on the rollers R1-R4. Further, the obtained film has the crumples, wrinkles, the scratch, and the scare of the adhesion.

As the result of the Comparisons 1-1&1-2, in the interval portion, the followings can be known. Namely, when it is designated to support or transport by the roller the film in which the content of the remaining solvent was at least 30 wt. %, the suction device is provided so as to contact the side edge portions of the film to the rollers with the suction, and to transport the film into the downstream side in accordance with the rotation of the rollers. Further, the roller interval is in the predetermined range. Thus the surface defects (such as the crumples, the wrinkles, the curls and the like) are reduced and the pollution of the rollers are prevented, efficiently, Furthermore, the regulation of the ratio VD/VU of the rotational speeds of the rollers makes the effect larger.

EXAMINATION 2

In Example 2, the polyvinyl alcohol film (produced by Kuraray Co. Ltd) having 75 μm thickness was dipped in an aqueous solution at 25° C., while the aqueous solution contains 0.3 g/litter iodine and 18.0 g/litter potassium iodide. Thereafter the film was tensed in an aqueous solution at 50° C., while this aqueous solution contains 80 g/litter boric acid and 30 g/litter potassium iodide. Thus the film becomes five times larger to the polarized film. The cellulose acetate film obtained in Example 1 was adhered to the polarized film with the adhesive agent, and thereafter they are dried for 30 minutes in thermostatic chamber in which the temperature of air was kept at 80° C. Note that the adhesive agent was a 4% aqueous solution of polyvinyl alcohol (trade name; PVA-117H, produced by Kuraray Co. Ltd.).

According to the obtained polarizing filter, a parallel transmittance Yp and a crossed transmittance Yc in the visible range was obtained with a spectrophotometer, and the polarizing coefficient PY was calculated on the basis of the following formula:

$$PY=\{(Yp-Yc)/(Yp+Yc)\}^{1/2} \times 100 (\%)$$

As the result of examination of Example 2, the polarizing coefficient PY of two sorts of polarizing filters constructed of the film produced in Example 2 was at least 99.6%. The film obtained in the solution casting method of the present invention was adequately used for the polarizing filter.

EXPERIMENT 3

A polarizing filter in a viewer's side of a TN liquid crystal display of transparent type (hereinafter LCD) provided with a notebook type personal computer was exchanged to the polarizing filter obtained Example 2, while a D-BEF (produced by Sumitomo 3M) as a polarization separation film having polarization optional layer was provided between a back light and a liquid crystal cell in the LCD.

As the result of examination of Example 3, in the obtained liquid crystal display, the brightness non-uniformity was not observed, and the quality of image is very high. The film obtained in the solution casting method of the present invention is adequately used for the liquid crystal display.

According to the present invention, the crumples and the wrinkles that are formed on the polymer film in the transporting section, and the slight deformation caused by the contact and the adhesion of the film to the roller in the transporting section the pollution of the rollers that is caused by the deposition of the additives from the polymer film can be prevented. As the results, even though the film production speed is made higher, the polymer film can be made thinner. Furthermore, the polymer film obtained in the present invention is excellent in the optical property, and can be adequately used for the polarizing filter and the liquid crystal display.

Various changes and modifications are possible in the present invention and may be understood to be within the present invention.

What is claimed is:

1. A solution casting method comprising:
   drawing with use of at least one suction device both side edge portions of a continuous polymer film to a plurality of rollers arranged in a transporting direction of said continuous polymer film whose content of a remaining solvent is at least 30 wt. %, such that said both side edge portions are in contact with said plurality of rollers, and a middle portion between said both side edge portions is apart from said plurality of rollers; and
   transporting said continuous polymer film toward a tenter device by rotating said plurality of rollers.

2. A solution casting method described in claim 1, wherein an interval L1 of neighboring rollers of said plurality of rollers in said transporting direction is in the range of 1 mm to 200 mm.

3. A solution casting method described in claim 1, wherein a lapping angle of each of said both side edge portions of said continuous polymer film around said plurality of rollers is in the range of 1° to 180°.

4. A solution casting method described in claim 1, wherein said suction device comprises a suction chamber, and an interval L2 between said suction device and said plurality of rollers is in the range of 0.5 mm to 5 mm.

5. A solution casting method described in claim 4, wherein an interval L3 between said suction chamber and said continuous polymer film is in the range of 5 mm to 30 mm.

6. A solution casting method described in claim 1, wherein when a rotational speed of one of said neighboring rollers downstream in said transporting direction is VD and a rotational speed of another one of said neighboring rollers upstream is VU, a ratio VU/VD of the rotational speed is in the range of 1.00 to 1.15.

7. A solution casting method described in claim 1, wherein an air is supplied toward a side of said middle portion facing said plurality of rollers.

8. A solution casting method described in claim 1, wherein said suction device comprises a plurality of suction ducts located beneath said plurality of rollers.

9. A solution casting method described in claim 8, wherein a single suction duct of said plurality of suction ducts provides suction at each edge portion of each roller of said plurality of rollers.

10. A solution casting method described in claim 1, wherein when a rotational speed of one of said neighboring rollers downstream in said transporting direction is VD and a rotational speed of another one of said neighboring rollers upstream is VU, a ratio VU/VD of the rotational speed is greater than 1.0.

* * * * *